Feb. 25, 1958 H. A. BILLETTER 2,824,947
TUBE MILL HOUSING
Filed Jan. 6, 1956 4 Sheets-Sheet 3

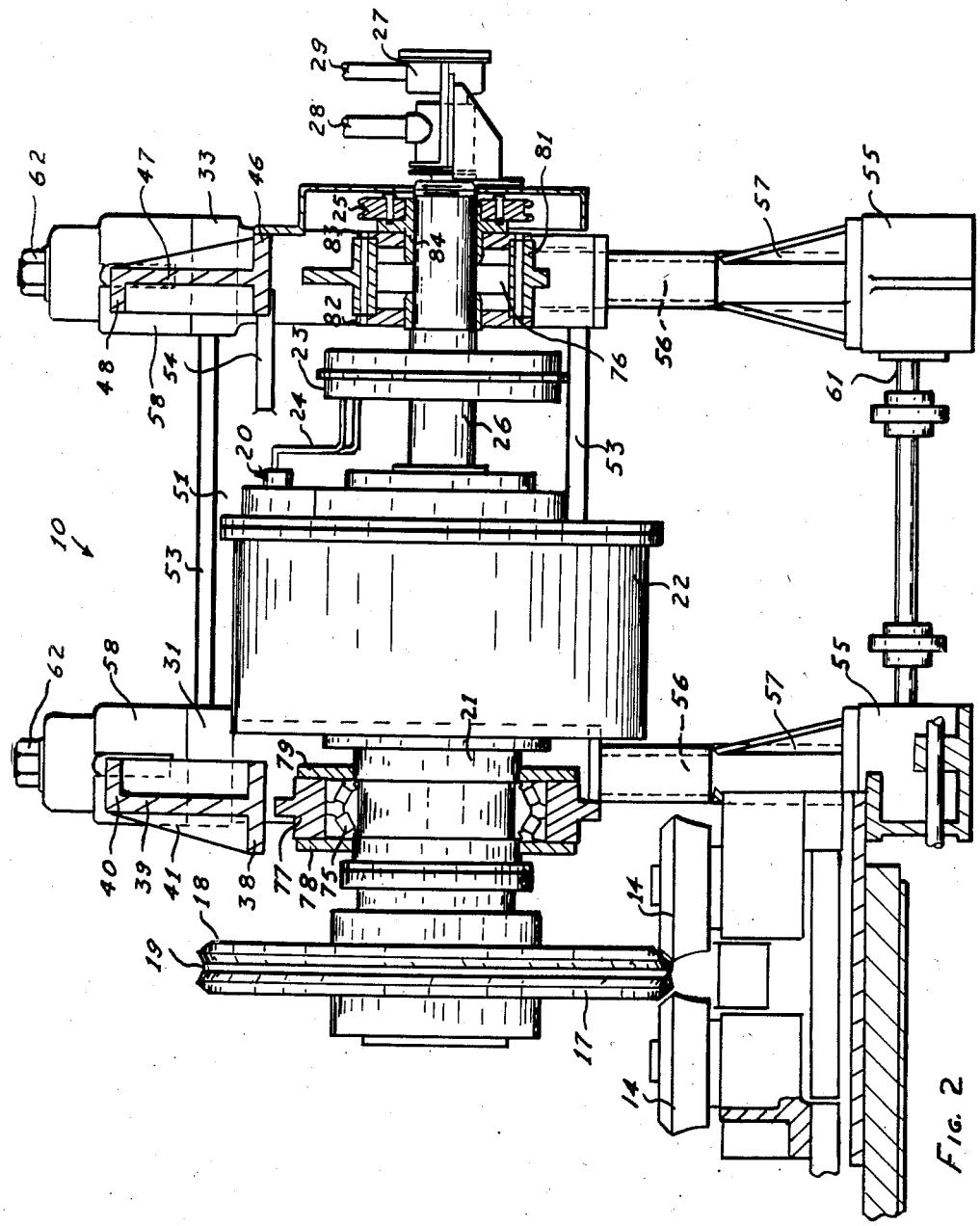

INVENTOR
HALTON A. BILLETTER
BY Francis J. Klempay
ATTORNEY

INVENTOR
HALTON A. BILLETTER
BY Francis J. Klempay
ATTORNEY

United States Patent Office 2,824,947
Patented Feb. 25, 1958

2,824,947

TUBE MILL HOUSING

Halton A. Billetter, Youngstown, Ohio, assignor to The McKay Machine Company, Youngstown, Ohio, a corporation of Ohio Application January 6, 1956, Serial No. 557,730

5 Claims. (Cl. 219—63)

The present invention relates to electric resistance welding apparatus of the butt-welding type used to weld an axial seam-cleft in a cylindrical tube length formed from a flat piece of metal or skelp in general and has particular reference to a new and novel tube mill housing for supporting the rotary transformer and other appurtenant equipment associated therewith.

It is common practice in the tube forming art to move a strip of metal or skelp through a series of feed and forming rolls toward a welding station, the arrangement being such that by the time the skelp has reached the welding station it has assumed a generally cylindrical shape having an axial seam-cleft along its length. At the welding station, a pair of large rotary electrode wheels pass over the cleft in the tube section, thus causing the opposed edges of the longitudinal split to be heated to the welding temperature. While at the welding station the edges of the tube are forced together under a predetermined pressure thereby completing the weld and forming a tube section having a strong and continuous seam.

Although the above described method and apparatus has been found particularly well adapted in tube mills, attention is drawn to the fact that the rotary transformer and electrode assemblies are of considerable physical size, necessitated by the electrical power required, and that it is common practice to mount the large wheel electrodes in an overhanging relation to facilitate their removal and replacement and to provide better visibility of the welding zone. Other considerations require that the welding wheel be firmly supported at closely adjacent points by various bearings between the rotary transformer and the welding electrodes. These criteria have often dictated large and cumbersome apparatus in the prior art for encasing and supporting the rotary transformer and other working parts of the tube mill which are distinguished by their multiplicity of parts, difficulty encountered in construction, and their relative inability to be accurately adjusted for different sizes and types of pipe.

It is, therefore a primary object of the present invention to provide a housing for the rotary transformer of a tube mill which is of the utmost simplicity of construction, requiring a minimum number of parts, yet, by virtue of its specific configuration, imparts the required strength and support to the rotary transformer and other elements carried thereby. The rotary transformer and wheel electrodes are of considerable size and must be amply supported for rotation about their own axis as is readily apparent. In the contemplated construction, the tube mill housing consists primarily of a large unitary casting adapted to receive the rotary transformer and in this manner many parts heretofore thought necessary in the prior art are eliminated and the assembly time for the entire apparatus is considerably reduced.

Another object of the present invention is to provide a new and novel rotary transformer housing having the characteristics outlined above which is easily and precisely adjusted for variations in the size and type of pipe being formed. The large rotary electrode wheels are movable in the vertical direction to apply a predetermined pressure on the slit in the cylindrical pipe or tube so that the desired quality of weld may be obtained. It is also necessary to be able to adjust the mechanism vertically with respect to the pass line of the stock in order to weld different sized tubes.

Yet another object of the invention is the provision of a tube mill housing wherein the rotary transformer and electrode assemblies are exposed for inspection and may be easily removed for replacement and maintenance with a minimum of "down time." In the prior art mechanism, complicated procedures are usually necessary for this operation, thus limiting the efficiencies of said tube mills.

A further object of the invention is the provision of a tube mill housing wherein the assembled apparatus is of the utmost simplicity and presents a pleasing appearance.

For a better understanding of my invention, as well as the disclosure of other objects and advantages, reference should now be had to the following specification and accompanying drawing wherein is shown and described a preferred embodiment of the present invention.

In the drawing:

Figure 2 is a partial side sectional view taken generally along the section line II—II of Figure 1;

Figure 1:
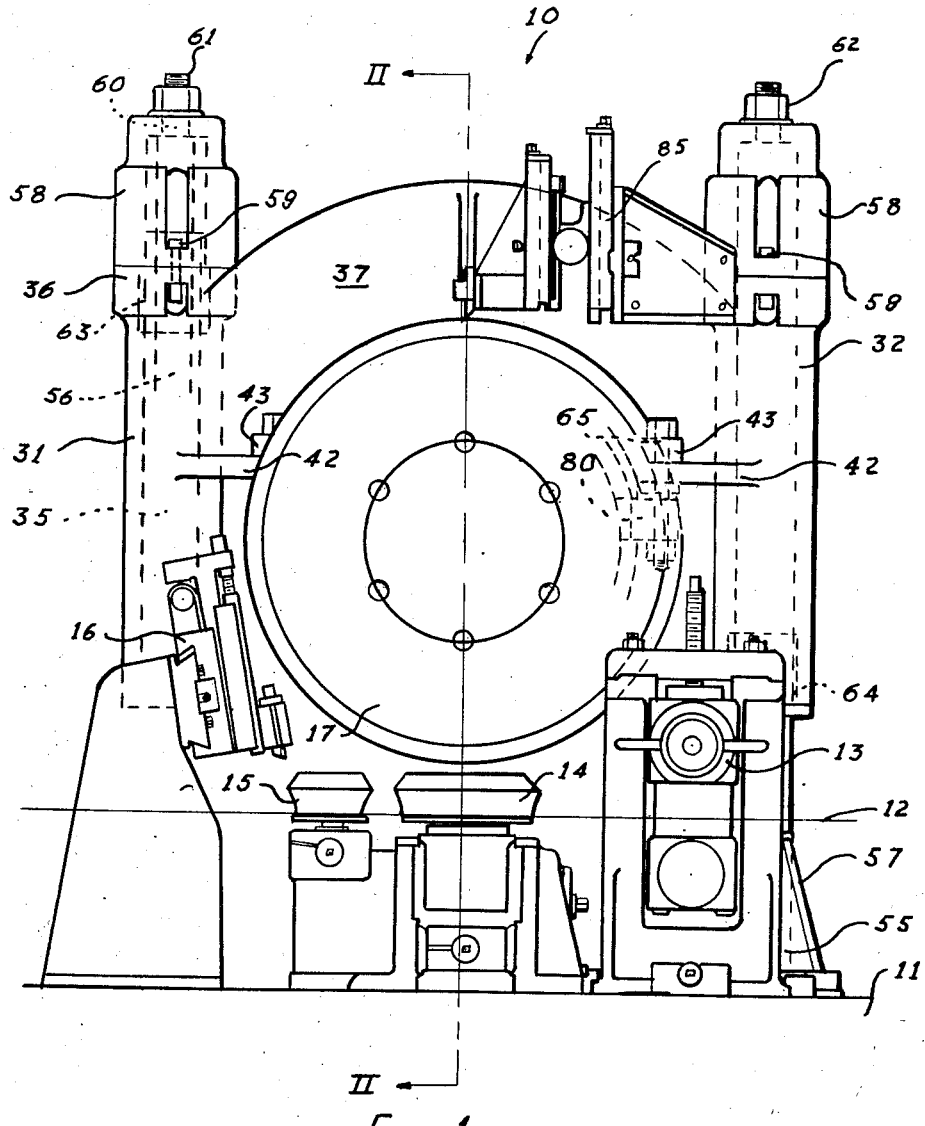
Figure 1 is a front elevation of the assembled tube mill housing constructed in accordance with the teachings of my invention.

Referring now to the drawing, and initially to Figures 1 and 2 thereof, the reference numeral 10 designates generally the welding station of a tube mill embodying my present invention and resting on a suitable foundation 11, such as the concrete floor of a plant, for example. In operation, a generally cylindrical tube (not specifically shown) is moved along the pass-line 12 from left to right as seen in Figure 1 through the seam guide rolls 13, the work supporting and guide rolls 14 situated at the welding station, the holding rolls 15, and then past the flash trimmer mechanism 16. Other suitable forming and feeding rolls (not shown) would also be provided in such a tube mill installation for forming the tube and conveying the same to the welding station.

Disposed above the work supporting and guide rolls 14 and adapted to cooperate therewith are a pair of large wheel electrode assemblies 17 and 18 operative to travel along the opposite edges of the longitudinal split in the cylindrical pipe section thereby heating the same and completing the weld making a continuous seam. The electrode assemblies 17 and 18 are insulated from each other by suitable insulation 19 so that electrical current is caused to flow across the gap in the pipe section from one electrode to the other and thereby causing the heating of these edge portions. To supply the large electrical potential needed for such operations a rotary transformer 20 is provided having the axis of a main supporting shaft 26 along the same line as the axis of the electrode assemblies 17 and 18 and connected thereto by the throat portion 21. Although the construction of the transformer 20 does not form a part of this invention and many different types of these transformers may be used in my tube mill housing, it is contemplated that a rotary transformer constructed in accordance with the teachings of U. S. Patent No. 2,616,016 issued to William E. Shenk and assigned to the assignee of the present invention, will be utilized.

In this type of transformer, the throat 21 serves as a housing for various electrical and coolant conduits communicating with the electrode assemblies, and the transformer carried in the housing 22. Slip rings 23 are positioned behind the housing 22 on the shaft 26 and are adapted to be connected by the conduits 24 to the transformer windings carried in the housing 22 and by brushes and other conduits, not shown, to a suitable source of alternating current potential, also not shown. Positioned rearwardly of the slip rings 23 is a sprocket 25 rigidly attached to the main shaft 26 of the transformer assembly 20 which is adapted to be driven by suitable means, such as a chain drive from a motor, not shown, thereby causing the transformer 20 and the electrodes 17 and 18 to rotate. The shaft 26 is preferably bored throughout a portion of its length and carries on its far end a standard rotary fluid joint 27 in order that nonconductive coolant may be circulated via the conduits 28 and 29 for cooling the assembled apparatus.

Figure 4:
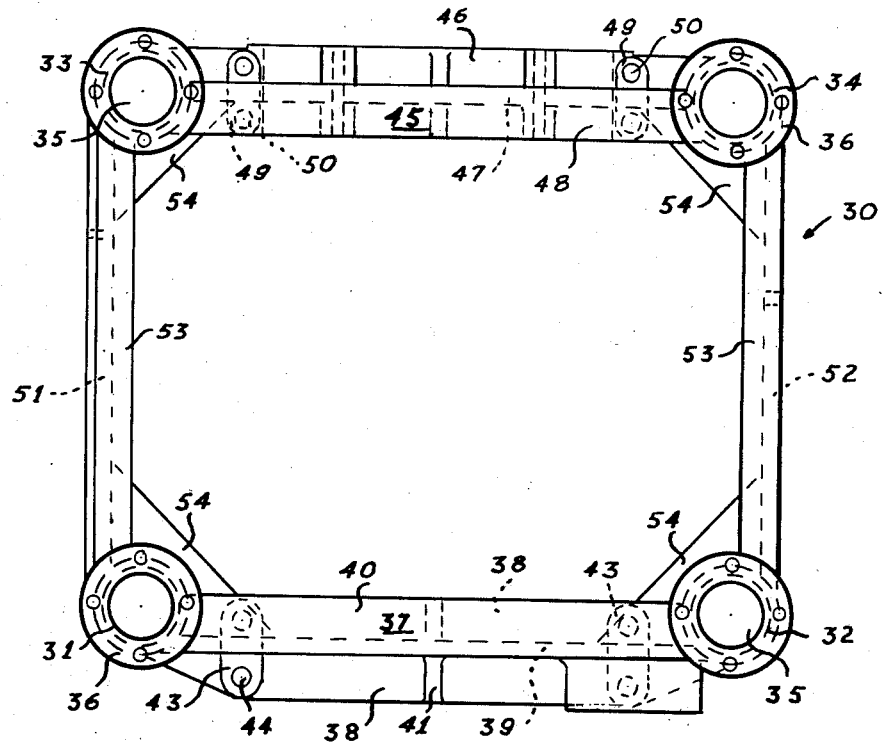
Figure 4 is a plan elevation of the casting depicted in Figure 3.
Figure 3:
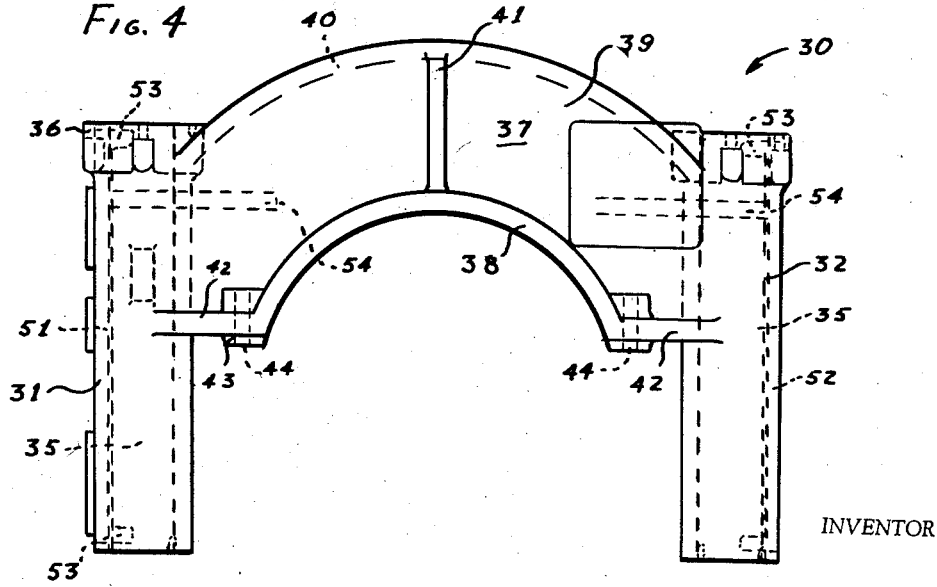
Figure 3 is a front view of the unitary casting forming a part of the apparatus shown in Figure 1.
Figure 6:
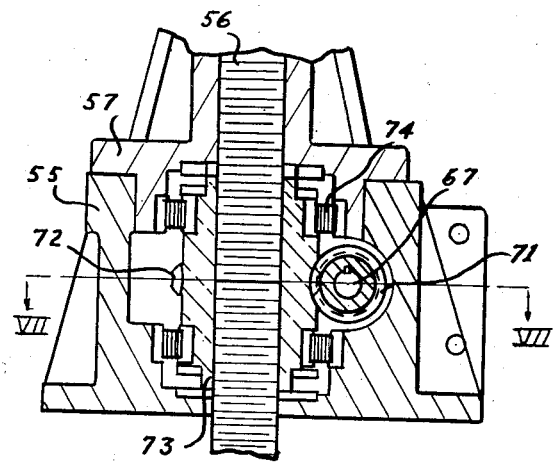
Figure 6 is a sectional view taken along the section line VI—VI of Figure 5.
Figure 7:
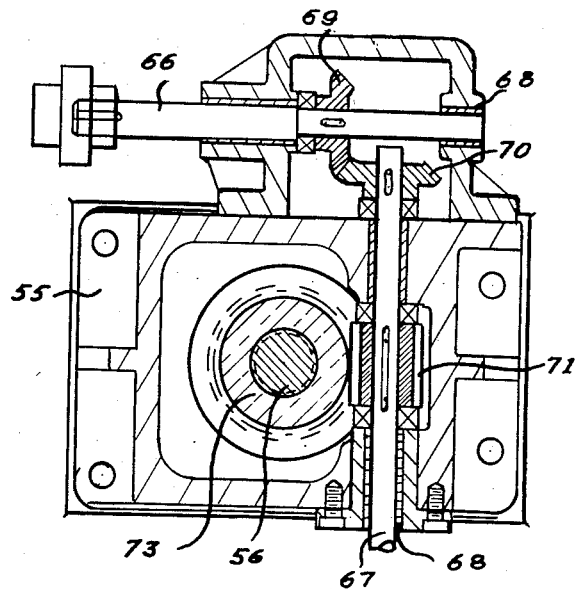
Figure 7 is a sectional plan elevation taken along the section line VII—VII of Figure 6.
Figure 5:
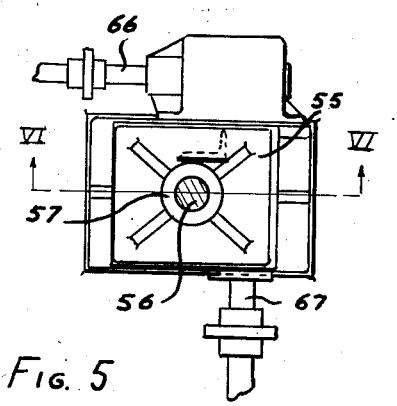
Figure 5 is a partial plan sectional view showing the connections for adjusting the heighth of the apparatus.

The rotary transformer and welding electrodes are of considerable weight and size and must be supported for rotation. To accomplish this end I provide a new and novel tube mill housing consisting primarily of the unitary casting 30 shown in Figures 3 and 4 of the drawing which includes the vertically extending columns 31—34 spaced to form a structure having a generally rectangular horizontal plan outline. The columns 31—34 are each bored to form the through-aperture 35 and have a top portion 36, the use of which will hereinafter be more fully explained. Spanning the two front columns 31 and 32 is the heavy semi-circular arch 37 which, as shown in Figure 2, has a cross-section composed of a plane-like base 38, the web 39, and the rearwardly directed top flange 40. Suitable supports, such as the web 41, may be provided to add greater inherent strength to the arch 37. The base 38 forms a semi-circular arc which does not quite reach from one column to the other, 31 and 32, respectively, but in fact has two horizontally extending portions 42 with the point of juncture between the curved base 38 and the portions 42 being considerably enlarged to form the four bosses 43, two on either side of the web 39, with the apertures 44 associated therewith.

The two rear columns 33 and 34 are spanned in a like manner by the arch 45 comprising the base plate 46, the web 47, and the forwardly directed top flange portion 48 with the base plate 46 forming a semi-circular arc and carrying the four bosses 49 having the apertures 50 therein. It is noted that the arches 37 and 45 are joined to their respective columns near the top and take approximately one half the heighth thereof so that the bosses 43 and 49 are positioned substantially in the middle between the top and bottom of the columns while the topmost points of the arches 37 and 45 are considerably higher than the top surface of the top portions 36 of the columns 31—34.

It is therefore seen that the front and the rear pairs of columns, 31—32 and 33—34, respectively, are tied rigidly together by the arches 37 and 45. To separate these pairs of columns, the side walls 51 and 52 are provided, these side walls being of approximately the same heighth as the columns 31—35 and each having inturned top and bottom flanges 53. Further horizontal and lateral support is provided in the present instance by the four gussets 54 positioned in each corner of the housing 30 near the top of the columns 31—34. In this manner the housing 30 can be easily manufactured from a single casting but yet the housing has the inherent strength necessary for supporting the rotary transformer and other associated equipment as will be further explained.

Now referring back to Figures 1 and 2 of the drawing, the unitary casting 30 is adapted to be supported above the floor or foundation 11, and by the spaced pedestals 55, on the vertically extending screws 56 which are secured in the holders 57 and the vertical adjustment mechanism to be later described. The screws 56 are of such a length that they protrude through the tops of the columns 31—34. Caps 58 are then put in place over the screws 56, and rest on the enlarged top portion 36 of the columns, being firmly held in place by means of the nuts and bolts 59 so that movement thereof demands a corresponding movement of the housing 30. The caps 58 are centrally apertured at 60 to receive the smaller diametered threaded head portions 61 of the screws 56, thereby defining flanges adapted to rest against the inner face of the caps 58, and a retaining nut 62 is provided to firmly clamp each of the screws 56 in rigid relation with respect to the cap and the column associated therewith. Circular bushings 63 and 64, preferably of bronze, may be inserted near the top and the bottom of each of the columns in order to facilitate manufacturing and curtail the amount of precise machining required.

Considering now the means to raise and lower the tube mill housing, it should be remembered that upon the movement of the screws 56, a like movement is experienced by the housing 30 due to the specific construction of the apparatus as previously explained. Journaled in each of the pedestals 55 are a pair of normal shafts 66 and 67 by the multiplicity of bearings 68 and interconnected by the bevel gears 69 and 70, respectively. Rigidly connected to the shaft 67 intermediate its ends thereof is the worm 71 which in turn is adapted to cooperate with the worm gear 72 attached to the outer surface of the annular nut 73 having threads around its inner periphery and adapted to cooperate with the screw 56. The annular nut 73 is mounted by the roller bearings 74 so that upon rotation of one of the shafts 66 or 67 the screw is forced up or down while the nut 73 stays in the same relative position thereby causing the housing 30 to be forced in the desired direction upon proper rotation of one of the shafts 66 or 67. It should be understood that although only one of the adjustment mechanisms is shown in the drawing, that each of the screws is somewhat similarly equipped, and it is contemplated that all of the adjustment mechanism will be interconnected and driven from a common motor. This arrangement affords positive movement of the housing 30 and allows accurate and precise adjustment thereof to obtain the desired quality of weld on the pipe sections.

As indicated throughout the previous discussion, the rotary transformer 20 and the electrode assemblies 17 and 18 must be mounted for rotation about their own axes, and this is accomplished by two anti-friction bearing assemblies 75 and 76 positioned between the electrodes 17 and 18 and the transformer housing 22 and intermediate the slip rings 23 and the sprocket 25, respectively. The bearing 75 is held in position by the annular ring-like housing 77 and the front and rear cover plates 78 and 79 which may be welded, or by some other means rigidly attached to the housing 77. The housing 77 has two pair of projecting ears 80 (see Figure 1) adapted to cooperate with the bosses 43 and the bolts 65 to hold the forward end of the rotary transformer in rigid relation with respect to the housing 30. Much of the same construction is utilized in securing the rear bearing 76 as I provide the annular bearing housing 81 and the cover plates 82 and 83 that form a carrier for the bearing 76. It is noted that the bearing housing 81 is not symmetrical with respect to the shaft 26, and this is because the shaft 26 is of much less diameter than the throat 21, and extra metal must be provided for attaching the rear bearing carrier to the bosses 49 in exactly the same manner as the connection of the front bearing housing 77. Spacers 84 may also be utilized to take up some of this play. A further difference in the construction and support of the front and rear bearing is that the cover plates 78 and 79 are spaced away from the bearing 76 in order that this bearing is free to "float" in the bearing housing to compensate for any expansion of the transformer during operation thereof due to an increase in temperature.

When it is desired to inspect or remove the rotary transformer and welding electrodes, there are two possible methods of manipulating the apparatus to accomplish this end. In the first instance, the shafts 66 and 67 are rotated in such a direction as to cause the lowering of the housing 30 and the transformer 20 to the lowermost position where the front and rear bearing carrying mechanisms may be removed as well as the electrode wheels and the rotary transformer pulled through the rear opening of the housing 30. The second method entails removing the four retaining nuts 62 and then running the housing and transformer to its most extended vertical position where the entire housing 30 may then be lifted from the screws 56. Obviously these methods of installing and/or removing the rotary transformer and welding electrodes are of comparative simplicity, it being understood that the specific method used will be dependent upon the repairs needed and the type of handling equipment available, such as overhead cranes, for example.

It should thus be apparent that I have accomplished the objects initially set forth by providing a new and novel housing for the rotary transformer of a tube mill which is operative to impart the required support to the rotary transformer and welding electrode assemblies but yet, by virtue of its specific configuration, is of the utmost simplicity and substantially mitigates the problems encountered in the like apparatus proposed in the prior art. The tube mill housing comprises primarily a unitary structure which may be cast as a single unit in any conventional manner and the casting requires a minimum of further working or machining before assembly of the entire apparatus. Also, attention is directed to the ease of vertical adjustment of the apparatus whereby the quality of weld may be accurately and precisely determined and regulated for different types and sizes of tubes being welded. A further advantage of the housing disclosed in the present invention is the manner in which the rotary transformer and welding electrodes may be removed for inspection or replacement, requiring a minimum of time, and a number of possible methods can be utilized for carrying out this operation.

Although I have shown and described a specific embodiment of the invention, it should be apparent that many changes may be made therein without departing from the teachings or the intent of the invention, and therefore reference should be had to the following appended claims in determining the full scope of the invention.

I claim:

1. In an electric resistance welding station for a continuous butt-weld tube mill the combination of a base, a rotary transformer and electrode assembly, and means to support and journal said rotary transformer at spaced points intermediate the ends thereof and above said base whereby said electrode assembly is supported in overhanging relation with respect to the pass line of the work; the improvement in said means to support comprising a unitary casting positioned to one side of the pass line of the work, said casting being generally rectangular in horizontal plan, four columns forming the corners of said casting thereby defining front and rear pairs of said columns, an arch joining said front pair of columns, a like arch joining said rear pair of columns, vertically extending and spaced parallel sidewalls connecting said front and rear pairs of said columns, each of said arches having a generally semi-circular base portion spanning the pair of columns associated therewith intermediate the heighth thereof, horizontally spaced and vertically extending bosses integrally formed on said base portion of each of said arches adjacent each of said columns, said bosses being vertically apertured, an annular bearing carrier associated with each of said arches and rigidly attached hereto in nesting relation with said base portion by attachment means anchored on said bosses, said annular bearing carriers encircling and journaling said rotary transformer intermediate its length for rotation about its own axis whereby said electrode assembly is positioned forwardly of said casting in overhanging relation with respect to the pass line of the work.

2. Apparatus according to claim 1 further characterized in that a plurality of horizontally spaced and vertically extending supports are mounted on said base, each of said vertical supports having an upper end portion of reduced cross section, said columns being apertured throughout their length, said supports adapted to extend through said apertured columns, a cap fitting rigidly attached to each of said columns having an aperture therein for the passage of said portion of reduced cross section of the support associated therewith and defining an abutment surface for said last mentioned support, locking means for securing said end portions of reduced cross section to said cap fittings, and means to vertically move said supports whereby said casting may be raised and lowered.

3. Apparatus according to claim 2 further characterized in that said means to vertically move comprises a threaded portion for each of said supports, a threaded fitting journaled in said base adapted to cooperate with said threaded portion of each of said supports, a worm gear around the outer periphery of each of said fittings, a worm for each of said fittings meshing with the worm gears thereof, means to drive said worms, and means interconnecting said supports whereby movement of one causes corresponding movement of the others.

4. In an electric resistance welding station for a continuous butt-weld tube mill the combination of a base, a rotary transformer and electrode assembly, and means to support and journal said rotary transformer at spaced points intermediate the ends thereof and above said base whereby said electrode assembly is supported in overhanging relation with respect to the pass line of the work; the improvement in said means to support comprising a unitary casting positioned to one side of the pass line of the work, said casting being generally rectangular in horizontal plan, four vertically extending and elongated columns forming the corners of said casting thereby defining front and rear pairs of said columns, an arch generally aligned with and joining said front pair of columns, a like arch joining said rear pair of columns, vertically extending and spaced parallel sidewalls connecting said front and rear pairs of said columns, each of said arches having a generally semi-circular base portion spanning the pair of columns associated therewith, an annular bearing carrier associated with each of said arches and rigidly attached thereto in nesting relation with said base portion by attachment means, said annular bearing carriers encircling and journaling said rotary transformer intermediate its length for rotation about its own axis whereby said electrode assembly is positioned forwardly of said casting in overhanging relation with respect to the pass line of the work.

5. Apparatus according to claim 4 further characterized in that said means to support further comprises a plurality of spaced vertically extending and vertically movable supporting members mounted on said base, each of said columns being apertured throughout at least a portion of its length, said supports being adapted to extend into said apertured columns and held rigidly with respect thereto, and means to raise and lower said supports whereby said rotary transformer may be raised and lowered.

References Cited in the file of this patent

UNITED STATES PATENTS

| | | |
|---|---|---|
| 2,181,652 | Caputo | Nov. 28, 1939 |
| 2,283,942 | Morris | May 26, 1942 |
| 2,284,315 | Yoder | May 26, 1942 |
| 2,370,485 | Nichols | Feb. 27, 1945 |